(12) United States Patent
Newman

(10) Patent No.: US 10,813,371 B2
(45) Date of Patent: Oct. 27, 2020

(54) APPARATUS AND METHODS FOR COOLING PRODUCTS

(71) Applicant: Michael D. Newman, Hillsborough, NJ (US)

(72) Inventor: Michael D. Newman, Hillsborough, NJ (US)

(73) Assignee: LINDE AKTIENGESELLSCHAFT, Munich (DE)

( * ) Notice: Subject to any disclaimer, the term of this patent is extended or adjusted under 35 U.S.C. 154(b) by 95 days.

(21) Appl. No.: 15/830,277

(22) Filed: Dec. 4, 2017

(65) Prior Publication Data

US 2018/0153189 A1 Jun. 7, 2018

Related U.S. Application Data

(60) Provisional application No. 62/430,554, filed on Dec. 6, 2016.

(51) Int. Cl.
*F25D 25/04* (2006.01)
*F25D 17/06* (2006.01)
(Continued)

(52) U.S. Cl.
CPC ............ *A23G 9/22* (2013.01); *A23G 9/166* (2013.01); *A23G 9/224* (2013.01); *F25B 19/005* (2013.01);
(Continued)

(58) Field of Classification Search
CPC .......... A23G 9/22; A23G 9/224; A23G 9/166; F25D 25/04; F25D 17/06; F25D 2400/30; F25D 13/067; F25B 19/005
See application file for complete search history.

(56) References Cited

U.S. PATENT DOCUMENTS 3,376,710 A * 4/1968 Hirtensteiner ............ F25D 3/11
62/374
3,708,995 A 1/1973 Berg
(Continued)

OTHER PUBLICATIONS

European Search Report for EP 17172276.2, dated Nov. 24, 2017, 8 pgs.
(Continued)

*Primary Examiner* — Ana M Vazquez
(74) *Attorney, Agent, or Firm* — Donald T. Black

(57) ABSTRACT

An apparatus for reducing a temperature of products includes a housing having a chamber within, wherein the chamber has upper and lower regions; a conveyor for transporting the products through the chamber, the conveyor constructed for substantial gas flow to pass through the conveyor without substantially reducing the ability of the conveyor to transport the products; an agitator associated with the conveyor for selective, intermittent contact with the conveyor to displace the conveyor from a plane of travel, thereby displacing the products on the conveyor to substantially prevent the products from adhering to the conveyor and other of the products; a gas circulation device disposed within the chamber to generate circulating gas flow within the chamber; and a shroud disposed within the chamber for coacting with the conveyor to provide an interface between the upper and lower regions, the shroud constructed and arranged to guide the circulating gas flow from the lower region through the conveyor to the upper region, and thereby facilitating displacement of the products on the conveyor to increase exposed surface area of said products. A related method is also provided.

11 Claims, 2 Drawing Sheets

(51) Int. Cl.
  *F25D 13/06* (2006.01)
  *F25D 3/11* (2006.01)
  *A23G 9/22* (2006.01)
  *A23G 9/16* (2006.01)
  *F25B 19/00* (2006.01)
  *F25D 3/12* (2006.01)

(52) U.S. Cl.
  CPC ........... *F25D 13/067* (2013.01); *F25D 17/06* (2013.01); *F25D 25/04* (2013.01); *F25D 3/11* (2013.01); *F25D 3/127* (2013.01); *F25D 2317/063* (2013.01); *F25D 2400/30* (2013.01)

(56) References Cited

U.S. PATENT DOCUMENTS

| | | | |
|---|---|---|---|
| 3,866,432 A | 2/1975 | Harrison | |
| 4,077,226 A * | 3/1978 | Strong | F25D 3/11 62/374 |
| 4,142,304 A | 3/1979 | Ricci | |
| 4,757,691 A * | 7/1988 | Compagnon | F25D 3/11 62/224 |
| 4,858,445 A | 8/1989 | Rasovich | |
| 5,365,752 A * | 11/1994 | Coffre | A23L 3/362 62/266 |
| 6,263,680 B1 | 7/2001 | Newman et al. | |
| 6,434,950 B2 | 8/2002 | Newman et al. | |
| 6,877,327 B2 | 4/2005 | Newman et al. | |
| 6,895,775 B2 | 5/2005 | Newman et al. | |
| 7,587,903 B2 | 9/2009 | Newman et al. | |
| 7,624,728 B1 | 12/2009 | Forbes | |
| 7,810,347 B2 * | 10/2010 | McCormick | B65G 15/60 62/380 |
| 7,992,393 B2 | 8/2011 | Newman | |
| 2010/0319365 A1 * | 12/2010 | Newman | F25D 3/11 62/63 |
| 2012/0273165 A1 | 11/2012 | McCormick et al. | |
| 2013/0125576 A1 | 5/2013 | Newman et al. | |

OTHER PUBLICATIONS

European Search Report for EP 17172274.7, dated Nov. 22, 2017, 9 pgs.

* cited by examiner

APPARATUS AND METHODS FOR COOLING PRODUCTS

BACKGROUND

The present embodiments relate to apparatus and methods for cooling or freezing products, such as individually quick-frozen food products.

In certain apparatus for cooling or freezing product, such as tunnel freezers, products are conveyed through the apparatus on a conveyor, such as a belt. A circulating flow of coolant and/or cryogen may be provided within the apparatus, in a direction downward towards the conveyor, for transferring heat from the items to the circulating flow of coolant/cryogen. In some embodiments, the apparatus are for freezing products intended to be individually quick-frozen ("IQF"), IQF products are desirably frozen without agglomerating with one another. In order to freeze IQF products, it is desirable to stack a certain amount of product onto the conveyor in order to quickly freeze as many products as possible. However, the depth or height of the product stacked on the conveyor may limit heat transfer, as convective heat transfer is reduced by products near the top of the stack blocking air flow from reaching products near the bottom of the stack.

In certain embodiments, the conveyor may be agitated in order to break up agglomerated products, prevent products from adhering to the conveyor, and/or increase exposed surface area of the products to increase heat transfer. However, such agitation may be insufficient to increase heat transfer when product is stacked too deeply on the conveyor, thereby limiting product throughput associated with such apparatus.

What is needed therefore is apparatus and methods for reducing a temperature of products, such as cooling or freezing products, which allow for increased heat transfer and product throughput.

BRIEF DESCRIPTION OF THE DRAWING(S)

The accompanying drawings are included to provide a further understanding of the apparatus and method(s) provided herein and are incorporated in and constitute a part of this specification. The drawings illustrate embodiments of the apparatus and method(s) provided herein and, together with the description, serve to explain the principles described herein but are not intended to limit the specification or any of the claims.

DESCRIPTION

Provided is an apparatus for reducing a temperature of products, such as without the products adhering to the apparatus or other of the products, comprising: a housing having a chamber within, wherein the chamber has upper and lower regions; a conveyor for transporting the products through the chamber, the conveyor constructed for substantial gas flow to pass through the conveyor without substantially reducing the ability of the conveyor to transport the products; an agitator associated with the conveyor for selective, intermittent contact with the conveyor to displace the conveyor from a plane of travel, thereby displacing the products on the conveyor to substantially prevent the products from adhering to the conveyor and other of the products; a gas circulation device disposed within the chamber to generate circulating gas flow within the chamber; and a shroud disposed within the chamber for coacting with the conveyor to provide an interface between the upper and lower regions, the shroud constructed and arranged to guide the circulating gas flow from the lower region to the upper region and through the conveyor, thereby facilitating displacement of the products on the conveyor to increase exposed surface area of the products.

As used herein, the term "substantially" refers to a degree of deviation that is sufficiently small so as to not measurably detract from the identified property or circumstance. The exact degree of deviation allowable may in some cases depend on the specific context.

Figure 1:
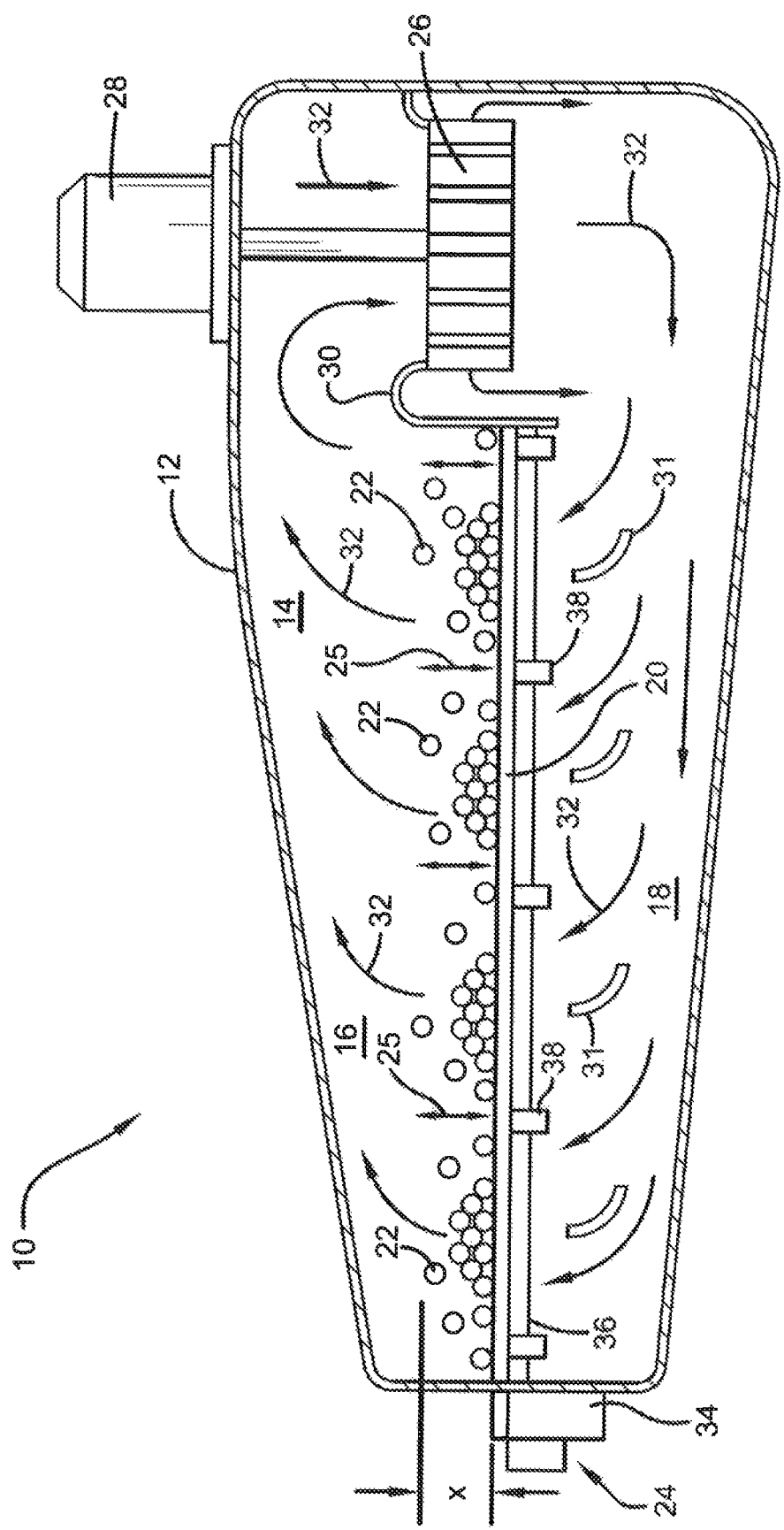
FIG. 1 is a cross-sectional view of an apparatus for reducing a temperature of products as described herein.

In certain embodiments, the chamber may have a shape or cross-sectional area for providing substantially constant gas flow velocities in the upper and/or lower regions of the chamber, based on an intended volumetric flow of the circulating gas. For example, in certain embodiments, the gas circulation device may be situated to the side of the conveyor, and the chamber may have a cross-sectional area which decreases as distance from the gas circulation device increases (as shown in FIG. 1, for example). As a result of these embodiments, the chamber may be shaped in such a way as to constantly reduce the cross-sectional area of the chamber in the direction of flow of the circulating gas, to provide constant gas flow velocity as the volumetric flow of gas decreases relative to the distance from the gas circulation device. In embodiments in which the gas circulation device is situated to the side of the conveyor, volumetric gas flow may decrease across the width of the chamber in the direction of circulating gas flow created by the gas circulation device, and the cross-sectional area of the housing may also decrease in order to provide substantially constant gas flow velocity through the conveyor. The substantially constant gas flow through the conveyor may allow for substantially even contact of the products on the conveyor, which results in even heat transfer throughout the products stacked on the conveyor.

In certain embodiments, the apparatus may further comprise at least one baffle disposed within the lower region of the chamber and having a surface constructed and arrange to direct the circulating gas flow through the conveyor. The at least one baffle may be constructed with an arcuate shape or cross-section to facilitate an upwardly directed flow of the circulating gas from the lower region through the conveyor to the upper region.

In certain embodiments, the conveyor may comprise a belt. In certain embodiments, the belt may comprise an open-mesh stainless steel (or other suitable material) belt which allows for the circulating gas flow to pass through the conveyor. The open-mesh belt does not substantially reduce the ability of the conveyor to transport the products. In conventional IQF product freezers, an axial flow fan is disposed above the conveyor, generating gas flow downwardly toward the conveyor. The downward gas flow dampens the effect of agitation of the conveyor. By providing circulating gas flow from beneath the conveyor, the agitation of the conveyor may be assisted by the circulating gas flow, allowing for increased heat transfer and/or increased product loading on the conveyor.

The agitator is associated with the conveyor such that the agitator makes selective, intermittent contact with the conveyor, displacing the conveyor from its plane of travel, thereby displacing the products on the conveyor during freezing to prevent products from adhering to the conveyor or to other products being conveyed. In certain embodiments, a wave-like motion is provided to the conveyor by utilizing a multiple cam wave axle for displacing a lifting bar, to contact and displace the conveyor. An optional bearing surface on the lifting bar may be engaged by the cam on the wave axle to displace the lifting bar. By "selective, intermittent contact", it is meant that the agitator may be engaged or disengaged (i.e., selective), and that, when engaged, the agitator may contact the conveyor at regular or random intervals (i.e., intermittent).

In certain embodiments of the agitator, the wave-like motion may be provided to the conveyor by utilizing a multiple cam wave axle for sequentially displacing consecutive lifting bars, to contact and displace the conveyor upwardly, in a forward or backward moving wave action on the conveyor belt. The bearing surface may include a lifting bar finger and the multiple cams on the wave axle comprise cam lifting lobes. The lifting bars may be engaged by cams that are disposed in a staggered or intermittent pattern about the radius of the axle and along its length.

The wave-like, sinuous or undulating motion (for the sake of brevity hereinafter "wave-like motion") provided through the conveying system may increase the product surface area exposed to the refrigeration medium, in which the refrigeration medium works either intermittently, simultaneously or continuously. The wave-like motion may also provide space between the products, such that the circulating gas flow proceeding upwardly through the conveyor and products is not substantially blocked.

In certain embodiments, the wave-like motion is present either in part of or along the entire length of the conveyor. In other embodiments, the wave-like motion is present so as to provide the conveyor with alternating sections of non-wave sections followed by wave sections, or wave sections followed by non-wave sections, or in any desired arrangement.

The wave-like motion may increase the heat transfer rates by increasing the product surface area exposed to the refrigeration medium that is normally not achieved when the product is touching other products or parts of the apparatus. This may result in one or more of uniform heat transfer, leading to shorter freezing times, improved yields, higher product quality, and increased cryogenic efficiency.

In certain embodiments, the gas circulation device may be a centrifugal blower or an axial flow fan. The gas circulation device is disposed within the chamber and associated with the shroud such that the circulating gas is directed through the conveyor from below. In certain embodiments, the gas circulation device may comprise a centrifugal blower disposed within the chamber to the side of the conveyor, wherein the shroud is associated with the centrifugal blower in a manner to force the circulating gas downwardly from the centrifugal blower.

In certain embodiments, the housing may include at least one injection port for injecting a coolant or cryogen (cryogenic substance) into the chamber. In certain embodiments, the coolant/cryogen may be injected into the lower region of the chamber, such that the coolant/cryogen mixes with the circulating gas flow prior to the circulating gas flow contacting the conveyor and the products. The coolant or cryogen may be, for most applications, carbon dioxide ($CO_2$) or nitrogen ($N_2$) in gaseous phase.

The term "cryogen" as used herein is similar to the term "coolant", and is not intended to necessarily be limited to materials or substances which have a purely cryogenic effect, although that meaning is intended to be included in the use of "cryogen". The term "coolant" as used herein means any material or substance which provides a cooling effect to or reduces a temperature of an item for chilling or freezing the item, such as for example a food product. In certain embodiments, the apparatus may alternatively or additionally be equipped with a mechanical refrigeration device to transfer heat from the apparatus to the surrounding environment.

Also provided is a method of reducing a temperature of products using a cooling apparatus, including a housing having a chamber therein, comprising: conveying the products on a conveyor through the chamber, wherein the conveyor allows for substantial gas flow through the conveyor without substantially reducing the ability of the conveyor to transport the products; generating circulating gas flow within the chamber; selectively and intermittently agitating the conveyor to displace the conveyor from a plane of travel, thereby displacing the products on the conveyor to substantially prevent the products from adhering to the conveyor or other of the products on the conveyor; and directing the circulating gas flow from beneath and through the conveyor, thereby facilitating displacing the products on the conveyor for increasing exposed surface area of the products.

In certain embodiments, the method may further comprise providing the chamber with a shape or cross-sectional area which allows for substantially constant gas flow velocities in the chamber, based on an intended volumetric flow of the circulating gas.

Figure 2:
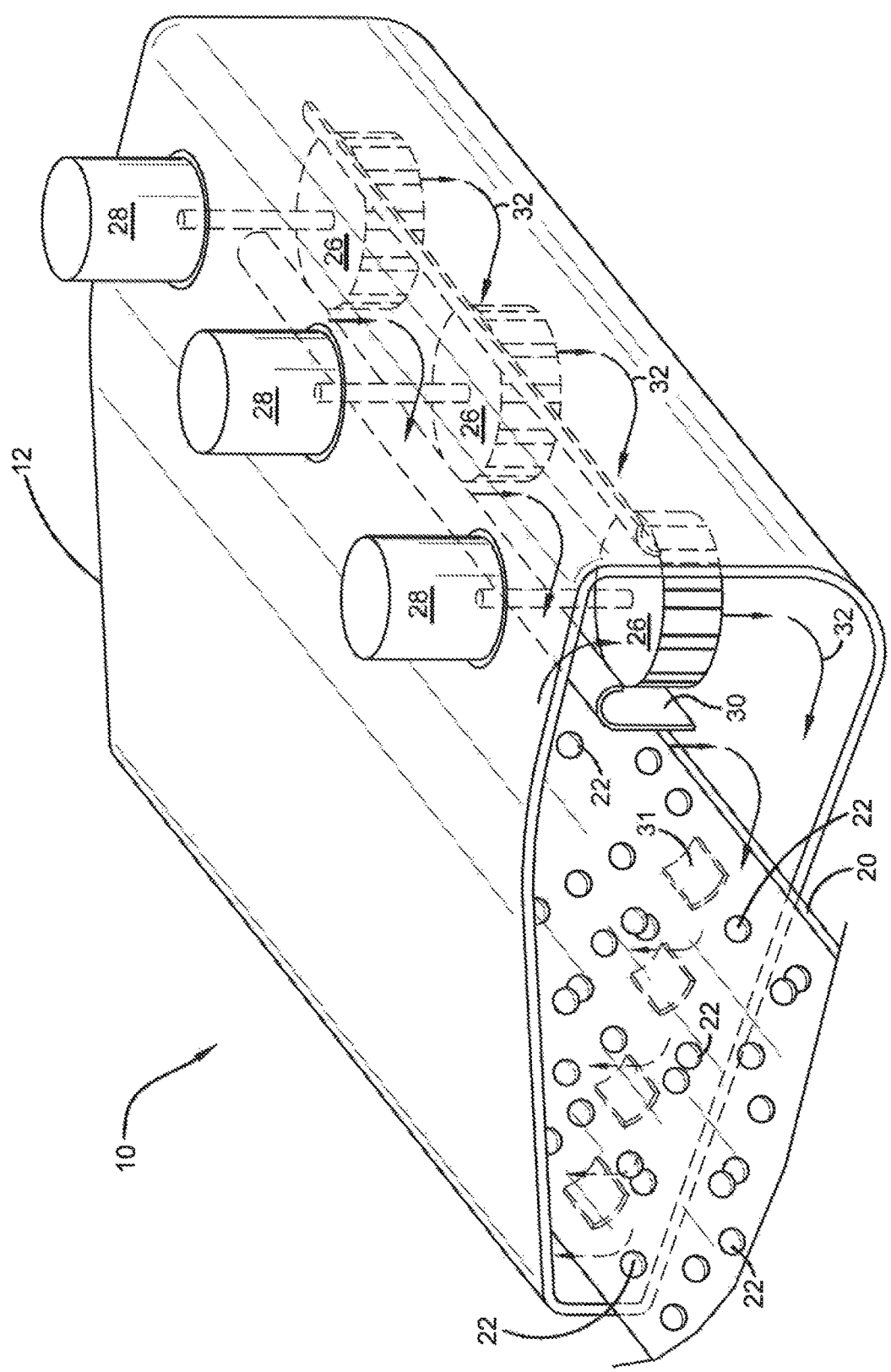
FIG. 2 is an isometric view of an apparatus for reducing a temperature of products as described herein.

In particular and referring to FIGS. 1 and 2, there is shown an illustrative apparatus 10 for reducing the temperature of products 22, such as IQF food products, the apparatus having a housing 12 defining a chamber 14 within the apparatus, wherein the chamber has an upper region 16 and a lower region 18. A conveyor 20, such as a belt, transports the products 22 through the chamber 14, The conveyor 20 is of a construction which allows for substantial gas flow through the conveyor without substantially reducing the ability of the conveyor to transport the products 22. An agitator 24 is associated with the conveyor 20 for selective, intermittent contact with the conveyor from a plane of travel, thereby providing displacement 25 of the products 22 on the conveyor to substantially prevent the products from adhering to the conveyor or other of the products. The agitator 24 may comprise a cam drive 34, a cam shaft 36 and at least one cam 38 for displacement of the conveyor 20 as described herein. A gas circulation device 26, such as a centrifugal blower, is disposed within the chamber 14 and driven by a motor 28 to generate circulating gas flow 32 within the chamber. The motor 28 may be mounted external to the housing 12 and is connected by a shaft to drive the gas circulation device 26. A shroud 30 is disposed within the chamber 14 such that the shroud guides the circulating gas flow 32 from beneath and through the conveyor 20, thereby facilitating the displacement 25 of the products 22 on the conveyor, which in turn increases the exposed surface area of the products. As shown in FIGS. 1 and 2, the conveyor 20 and the shroud 30 coact to define an interface between the upper and lower regions 16, 18, respectively, of the chamber 14. The apparatus 10 may include at least one baffle 31 disposed within the lower region 18 of the chamber 14 to direct the circulating gas flow 32 from the lower region 18 through the conveyor 20 to the upper region 16.

It will be understood that the embodiments described herein are merely exemplary, and that one skilled in the art may make variations and modifications without departing from the spirit and scope of the invention. All such variations and modifications are intended to be included within the scope of the invention as described and claimed herein.

Further, all embodiments disclosed are not necessarily in the alternative, as various embodiments of the invention may be combined to provide the desired result.

What is claimed is:

1. An apparatus (10) for reducing a temperature of at least one product (22), comprising:
   a housing (12) having a chamber (14) within;
   a conveyor (20) for transporting the at least one product (22) through the chamber (14), wherein the chamber (14) has an upper region (16) above the conveyor (20) and a lower region (18) below the conveyor (20), the conveyor (20) constructed for substantial gas flow to pass through the conveyor (20) without substantially reducing the ability of the conveyor (20) to transport the at least one product (22);
   an agitator (24) associated with the conveyor (20) for selective, intermittent contact with the conveyor (20) to displace the conveyor (20) from a plane of travel, thereby displacing the at least one product (22) on the conveyor (20) to substantially prevent the at least one product (22) from adhering to the conveyor (20) and other of the at least one product (22);
   a gas circulation device (26) disposed within the chamber (14) to the side of the conveyor (20) and a shroud (30) disposed within the chamber (14) for coacting with the conveyor (20) and with the gas circulation device (26) to provide an interface between the upper region (16) and the lower region (18), the gas circulation device (26) disposed to generate circulating gas flow (32) within the chamber (14) from the gas circulation device (26) from the interface between the upper region (16) and the lower region (18) into the lower region (18) and thereafter through the conveyor (20) from the lower region (18) into the upper region (16); and
   the shroud (30) constructed and arranged to guide the circulating gas flow (32) from the lower region (18) to the upper region (16) and through the conveyor (20), thereby facilitating displacement of the at least one product (22) on the conveyor (20) to increase exposed surface area of said at least one product (22).

2. The apparatus of claim 1, wherein the chamber (14) comprises a shape that is capable of providing substantially constant gas flow velocities in the upper region (16) and/or in the lower region (18), based on an intended volumetric flow (32) of the circulating gas.

3. The apparatus of claim 1, wherein the gas circulation device (26) is positioned at the side of the conveyor (20), and the chamber (14) comprises a cross-sectional area which decreases as distance increases from the gas circulation device (26).

4. The apparatus of claim 1, further comprising at least one baffle (31) disposed within the lower region (18) and having a surface constructed and arranged to direct the circulating gas flow (32) through the conveyor (20) from the lower region (18).

5. The apparatus of claim 1, wherein the conveyor (20) is selected from the group consisting of a belt, and an open-mesh belt.

6. The apparatus of claim 1, wherein the agitator (24) comprises a cam drive (34), a cam shaft (36) and at least one cam (38).

7. The apparatus of claim 1, wherein the gas circulation device (26) comprises at least one centrifugal blower.

8. The apparatus of claim 1, further comprising a motor (28) connected to and driving the gas circulation device (26).

9. The apparatus of claim 8, wherein the motor (28) is mounted external to the housing (12).

10. The apparatus of claim 8, further comprising a shaft interconnecting the motor (28) with the gas circulation device (26).

11. The apparatus of claim 1, wherein the at least one product (22) comprises at least one food product.

* * * * *